United States Patent

Di Massimo

[15] 3,657,481

[45] Apr. 18, 1972

[54] PAY TELEPHONE STATION WITH AUTOMATIC DIALING APPARATUS

[72] Inventor: Donald V. Di Massimo, Edison Township, Middlesex County, N.J.

[73] Assignee: G-V CONTROLS Inc., Livingston Township, N.J.

[22] Filed: Mar. 17, 1970

[21] Appl. No.: 20,188

[52] U.S. Cl. ..........179/6.3 R

[51] Int. Cl. ..........H04m 17/02

[58] Field of Search ..........179/6.3 R, 90 B

[56] References Cited

UNITED STATES PATENTS 3,406,256 10/1968 Strommen ..........179/6.3

3,078,349 2/1963 Sasaki ..........179/90 B 2,733,295 1/1956 Lomax..........179/6.3

FOREIGN PATENTS OR APPLICATIONS 1,187,685 2/1965 Germany ..........179/6.3

*Primary Examiner*—Kathleen H. Claffy
*Assistant Examiner*—Tom D'Amico
*Attorney*—Charles T. Jacobs

[57] ABSTRACT

At a telephone pay station there is provided automatic dialing apparatus which renders that station usable without the deposit of a coin therein but only subject to telephone-address limitations imposed by preprogramming of that apparatus.

5 Claims, 1 Drawing Figure

Patented April 18, 1972 3,657,481
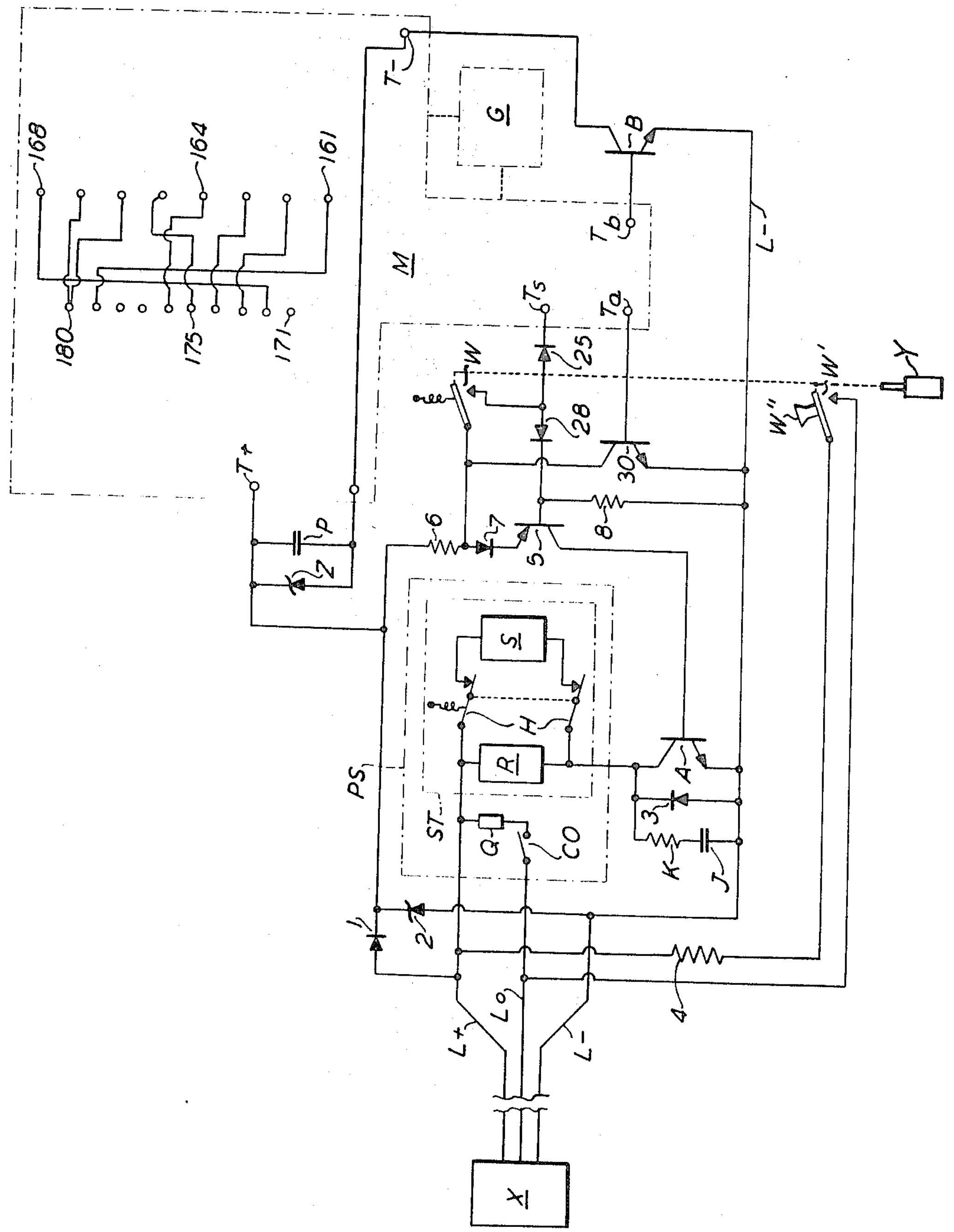
INVENTOR
DONALD V. DI MASSIMO
BY [signature]
ATTORNEY

PAY TELEPHONE STATION WITH AUTOMATIC DIALING APPARATUS

This invention relates to telephone systems. It more particularly relates to such a system which includes a pay station of the type normally requiring, as a preliminary to any calling use thereof, the deposit therein of a coin. Such a system will also, of course, comprise a telephone line to which the pay station is connected, and the line will be energized for dialing and communication from the station thereover only in response to an energization command transmitted from the pay station over the line to the exchange — it being the transmission of that command which normally requires the deposit of the coin.

For some purposes, notably communication with a predetermined telephone address to report an emergency (such as fire), it is desirable to render the pay station capable of use without the deposit of a coin — but to do so in a manner precluding its coinless operation for dialing of and communication with any address for which the emergency use is not intended. The invention is directed to the achievement of that objective.

According to a general aspect of the invention there is located at the pay station an automatic dialing apparatus actuable to impress upon the line a coded series of spaced signals, preprogrammed within that apparatus, appropriate to the dialing of a predetermined telephone address — typically, an address at which emergency calls are received. At the pay station there is located a means actuable to transfer to the automatic dialing apparatus, until after such signal impression, the control of dialing from the pay station. A switch means is located at the pay station which is temporarily operable to transmit an energization command from the pay station to the exchange, and both the automatic dialing apparatus and the transferring means are operatively connected with that switch means for operation of each as an incident to the operation of that switch means. By the arrangement thus provided the pay station is rendered usable without the deposit of any coin — but only under the address limitation imposed by the preprogramming within the automatic dialing apparatus.

Desirably (though not indispensably) the automatic dialing apparatus includes control means which are normally unenergized but which upon actuation of said apparatus become energized from the line until after the impression of the series of signals on the line. In such a case the operative connection of that apparatus with the abovementioned switch means may provide for actuation of the apparatus subsequent to the initiation of the line energization invoked by the operation of the switch means.

Objects of the invention have been made apparent above. Allied and other objects of the invention will more fully appear from the following detailed description and the appended claims In that description reference is had to the accompanying drawing, in which:

FIG. 1 is a schematic diagram of a system incorporating the invention.

In the description of the embodiment of FIG. 1 it will be convenient first to deal with so much of its circuitry as amounts to a simple (non-pay) station, a simple (two-conductor) telephone line serving that station, and typical automatic dialing apparatus associated with the station. Such circuitry is shown by way of example in the form of a simplified schematic illustration of subject matter detailedly shown in FIG. 2 of my co-pending application Ser. No. 819,819, filed Apr. 28, 1969, now U.S. Pat. No. 3,592,974, whose identifying symbols have been re-used in FIG. 1 of this application where applicable. In general, this comprises the elements shown in FIG. 1 hereof other than those constituted by enclosure PS, switch CO, coil Q, conductor $L_o$, exchange X, resistor 4, switch W' and delay device Y.

Thus in FIG. 1, L+ and L− denote two conductors of a telephone line, which at this stage of the description are postulated to be energized by the presence of voltage therebetween. G denotes a signal generator, and M denotes an electrically energizable control means with which the signal generator is connected and which is actuable to cause the generation by G of signalling, preprogrammed within M, appropriate to the dialing of a predetermined telephone address. ST denotes a simple pulse-dialing telephone station comprising the usual station network, handset and manual dialing mechanism (collectively designated as S), a multi-pole hook switch H through which S is to be connected across L+L− when the handset is off hook, and a ringer R connected across the line side of H. The connection of the station ST to conductor L+ may be direct, but its connection to conductor L− is made through the collector-emitter path of a normally-conductive NPN-transistor A (shunted by a reversely poled diode 3 in order to provide full access for alternating ringing currents to R).

In arranging for the normally-conductive state of transistor A its base may be supplied with current from the collector of a PNP-transistor 5, which in turn is supplied with emitter current from conductor L+ through a diode 1, a resistor 6, and a diode 7; the two transistors 5 and A will be jointly conductive or non-conductive, and the task of rendering A non-conductive at certain times may be performed by then diverting current from the emitter of transistor 5. In FIG. 2 of my co-pending application above referred to arrangements for accomplishing such diversion were shown within the control means M; in FIG. 1 of this application the essential elements of those diverting arrangements, together with the actuating means for M, have for clarity been shifted to and are shown outside of M. Those elements comprise (a) an NPN-transistor 30 whose collector is connected to the junction between resistor 6 and diode 7 and whose emitter is connected to conductor L−, and (b) an openly-biased switch W one terminal of which is connected to the junction just mentioned and whose other terminal is connected (i) to the transistor-5 base, from which a resistor 8 is connected to L, through a diode 28 and (ii) to a "-Start" terminal $T_s$ on control means M through a diode 25. Transistor 30 is under the control of a terminal $T_a$, on control means M, to which its base is connected.

The control means M is provided with a pair of energy - input terminals T+ and T−, shunted by a capacitor P and a Zener diode Z, and is energized by the supply of direct current to those terminals from L+L−. For this purpose T+ may be connected to conductor L+ through the diode 1 (a relatively high-voltage Zener diode 2 preferably being shunted from T+ to L− to guard against the imposition of excessive transients from L+L− onto M); T− may be connected to conductor L− through the collector-emitter path of a normally-non-conductive NPN transistor B. Transistor B is in turn under the control of a terminal $T_b$, on control means M, to which its base is connected and by which it may be rendered conductive at certain times.

The period during which the control means M is energized, and during which the states of transistors A and B are altered as hereinafter set forth, may be termed the dialing period; it comprises the duration of the series of signals to be impressed on L+L− and the non-signal intervals between the successive signals, and in the embodiment under description it is postulated also to include an initial non-signal interval preceding the first of the signals. The dialing period will be initiated by a temporary closure of switch W — i.e. closure for several milliseconds or more — which renders positive (relative to L−) the start terminal $T_s$ on the control means M and thereby energizes M as hereinafter reverted to. At the initiation of closure of switch W terminal $T_b$ on the control means will, through circuitry within M, forthwith be rendered positive (relative to L−) and transistor B therefore conductive; also forthwith transistor A will be rendered non-conductive — initially (i.e. during the switch-W closure) by the diversion of transistor-5 emitter current through switch W and diode 28, and resistor 8 to L− and thereafter by diversion of that current to L− through the collector-emitter path of transistor 30, which is then conductive as a result of $T_a$ having been rendered positive (relative to L−) through circuitry within M.

Transistor B, in the conductive state in which it is placed at the beginning of the dialing period, constitutes a means effecting a low-resistance current-conducting connection of the energy-input terminals T+ and T− across L+L− and accordingly it causes, after the few milliseconds required for substantial charging of capacitor P, the energization of the control means M. Assuming the closure of W to have been continued for at least that long the control-means energization will be maintained, without any requirement for continuance of closure of W, throughout the dialing period; this maintenance during the non-signal intervals will be from the line through the then-conductive transistor B, and during the signals (when B's conductivity is interrupted as set forth in the next succeeding paragraph) will be by energy stored during the intervals in the capacitor P.

Transistor A in its non-conductive state which obtains throughout the dialing period serves then to free conductors L+L− of loading by the station network within S. The energization of control means M from L+L− through transistor B during the non-signal intervals within that period serves during those intervals to provide a substitute loading of L+L−. During the signals the control means (then energized from P) removes positive potential from $T_b$, and the resulting non-conductivity of B serves then to interrupt that substitute loading — it being by such interruptions that, in the FIG. 1 circuit, there is imposed on L+L− a coded series of spaced signals preprogrammed within M.

At the conclusion of the dialing period circuitry within M causes $T_a$ and $T_b$ to lose their positive potentials; transistor A resumes its normally-conductive state, transistor B resumes its normally non-conductive state, and control means M returns to its unenergized state.

For the preprogramming of the coded series of spaced signals there have been shown within M a group of eight terminals 161 through 168 respectively allocated to eight successive address digits, and a group of 10 terminals 171 through 180 respectively allocated to the progressive numbers from 1 through 10; suitable interconnections between the two groups accomplish the preprogramming — for example, the interconnections shown in FIG. 1 will preprogram the telephone address "93465002." Complete details of such preprogramming arrangements — and of all other portions of a typical control means M — have been disclosed in my co-pending application above referred to; their repetition herein is not presently thought necessary to an understanding of the instant invention.

Broadly, signal generator G, transistor B, control means M (with capacitor P and Zener diode Z), and switch W may be considered as constituting automatic dialing apparatus located at the station and actuable (by closure of W) to impress upon L+L− a coded series of spaced signals, preprogrammed within that apparatus, appropriate to the dialing of a predetermined telephone address. Correspondingly, control means M, transistor B, transistor A (with transistors 5 and 30), and switch W may be considered as constituting means located at the station and actuable (also by closure of W) to transfer to that automatic dialing apparatus the control of dialing from the station.

Attention now being turned to the portions of FIG. 1 which are appropriate to simple pay-station operation, there will be seen an enclosure PS within which are located the elements of the pay station. Those elements of course include the elements of ST; they also include a coil Q and a normally-open switch CO in series therewith to form a series circuit which is connected between conductor L+ and a conductor $L_o$ — the conductors L+, $L_o$ and L− making up a three-conductor telephone line connecting the pay station PS to the exchange X. Normally the voltage above postulated to be present between L+ and L− will be absent, and the line will be unenergized insofar as dialing and communication thereover from the station is concerned; there will, however, be some voltage, impressed at the exchange X, between the conductors L+ and $L_o$. The normally open switch CO will be closed by the deposit of an appropriate coin in the pay station.

It may be noted that after being closed by coin deposit the switch CO will remain closed until the coin is released from its switch-closing position. Such release is ordinarily effected at an appropriate time by the impression (at the exchange) on conductor $L_o$ of an appropriate high voltage relative to L+, this voltage serving momentarily to energize the coil Q through the then closed switch CO; depending on the polarity of the voltage, the coin will then be released either for collection in the pay station or for return to the calling party — and in either case the release will be accompanied by the restoration of the switch CO to its normally open condition. The details of typical arrangements by which the actions described in this paragraph may be effected are not parts of the present invention and are not herein illustrated or further described.

Closure of switch CO as a result of coin deposit will in turn result in the setting up at the pay station of a path (Q-CO) for the conduction of current between conductors L+ and $L_o$; the resulting current through that path will effect an energization command, transmitted over L+$L_o$ to the exchange X, in response to which elements in the exchange will act to impress a d.c. voltage between the conductors L+ and L−, thereby energizing the line for dialing and communication thereover from the pay station. The energization of the line will ordinarily be quite promptly accompanied by the superimposition, on the d.c. voltage then present between L+ and L−, of the oscillatory voltage which represents dial tone, and thereupon any local telephone address may be dialed and communicated with from the pay station. It is, of course, here postulated that the hook switch will have been closed at an appropriate early time by the removal of the handset therefrom.

For normal pay-station operation there is required during such dialing and communication a maintenance of the closed condition of switch CO until the time when coin release is to be effected — this being in order to provide at that time a path through which the coin-releasing voltage (of either polarity) may effect an appropriate flow of current through coil Q. It does not, however, follow that such closed condition of CO (or current-carrying path at the station between L+ and $L_o$) need be maintained for the mere function of maintaining the line energization up to that time; to the contrary, in widely-used systems that energization, once invoked by a sufficient temporary closure of switch CO, continues without further reliance on such closure (or current-carrying path). In short, with such systems the energization command itself actually consists of an initial brief period of the switch-CO closure, and this requires a temporary action only.

The present invention, taking advantage of the last-mentioned fact, provides at the pay station a temporarily operable (e.g. normally open temporarily closeable) switch W'; a resistor 4 and the switch W' may be connected together to form a series circuit which in turn is connected between conductors L+ and $L_o$ (i.e. in parallel with the series circuit formed by Q and CO). A button W'' is shown for the manual operation of W'. Both the automatic dialing apparatus and the means for transferring thereto the control of dialing from the pay station may be operatively connected, for example by a mechanical connection of their common switch W, with the switch W' for actuation of each as an incident to the operation of switch W'. Then, with the hook switch H closed by removal of the handset therefrom but without manipulation of any manual dialing mechanism, the temporary operation of W', as an incident to which there will be a temporary operation of W, will serve to cause a temporary conduction of current between L+ and $L_o$ and thereby to command line energization — and to actuate both the automatic dialing apparatus and the control-transferring means, and thereby to initiate the dialing period.

The actuation of the automatic dialing apparatus (and the transferring means) typically requires only a few milliseconds operation of switch W — but this must be while the line stands energized. In the FIG. 1 embodiment the line becomes energized only after operation of switch W' for a brief period (dealt with later in this paragraph), and the operative connection of the automatic dialing apparatus with switch W' must provide for the actuation of that apparatus subsequent to that period. The simple interconnection of the apparatus-actuating switch W with switch W' for joint operation of the two does of course so provide — requiring only that such joint operation be for a few milliseconds longer than the brief period required by W' for its own energization-commanding function. The brief period of operation of the switch W' required for assured energization of the line may vary considerably from exchange to exchange, but may typically be of the order of 250 milliseconds or less — so that a joint closure of the two switches for that period plus a few milliseconds will serve the requirements for operation of W' and W taken jointly. To insure such operation for at least as long as required any convenient means (e.g. mechanical, electrical or instructional) may be employed; FIG. 1 by way of example shows a dash-pot Y which appropriately retards switch reopening.

During the dialing period initiated by the operation of switch W incident to the operation of W' there will of course take place the dialing of the predetermined telephone address as earlier described; meanwhile the effective disconnection of the pay station PS will preclude any manipulation of that station (whether of its dial, of its hook switch, or other) from disturbing or altering that dialing — a function of especially high desirability in the case of a pay station such as PS whose coinless use is to be under the telephone-address limitation imposed by the programming within the associated automatic dialing apparatus. At the conclusion of the dialing period, when the automatic dialing apparatus has completed its function and its control means M has been de-energized, the pay station PS is effectively reconnected to the line; this re-transfers dialing control to the pay station itself — but that is at this juncture without significance, since the command to dial the predetermined address has already been fully transmitted to the exchange, which in its usual manner proceeds to accomplish that dialing and the resultant ringing. As a result of the reconnection of the pay station PS the caller will be able to hear that ringing in the earpiece of his handset. (If it be though desirable that he also be able to hear the dialing itself, the collector-emitter path of transistor A may be shunted with a series circuit comprising an appropriate capacitor J and resistor K). Upon answer by the predetermined address the calling party will of course proceed with his conversation; it will be upon his subsequent hang-up that the line will be restored to its quiescent state of de-energization.

It is course to be appreciated that the elaboration of the pay station by the additional apparatus disclosed as located at that station is totally without effect on its usability in the normal "-pay" manner — but that it as an existing installation has been availed of for an additional use which would otherwise require not only considerable apparatus in itself but also an entirely separate and additional line from its locality to the exchange.

The showing of the programming as being for an eight-digit telephone address is purely by way of example; in many instances it need be only for fewer digits — in some, for example, for a single digit consisting of 10 pulses (in which case the predetermined address will be the telephone "operator"). Further, the coded series of spaced signals need not be of the "pulse" variety; it may for example alternatively be of a series of dual-frequency tone-dialing signals — the signal-generating and control means and immediately related circuitry (other than for such elements as the coil Q, coin-operated switch CO, resistor 4 and switch W' etc.) being for example of the nature detailedly disclosed in and in connection with FIG. 7 of my co-pending application above referred to. Thus while I have shown and described my invention in terms of a particular embodiment thereof, it will be understood that I intend thereby no unnecessary limitations. Modifications in many respects will be suggested by my disclosure to those skilled in the art, and such modifications will not necessarily constitute departures from the spirit of the invention or from its scope, which I undertake to define in the following claims.

I claim:

1. The combination, with a telephone system comprising a pay station, an exchange, and a telephone line therebetween, the line being energized for dialing and communication from the pay station thereover only in response to an energization command, transmitted from the pay station over the line to the exchange, normally requiring the deposit of a coin in the pay station: of (1) automatic dialing apparatus located at the pay station and responsive to a temporary electrical actuation for dialing the successive digits of a predetermined telephone address by impressing upon the line a coded series of digit-representing signals preprogrammed within that apparatus, (2) means located at the pay station and responsive to a temporary electrical actuation for transferring to said automatic dialing apparatus until the completion of dialing of said digits the control of dialing from the pay station, and (3) switch means located at the pay station and temporarily operable independently of coin deposit to transmit an energization command therefrom over the line to the exchange, both said automatic dialing apparatus and said transferring means being operatively connected with said switch means for actuation of each as an incident to operation of said switch means, whereby the pay station is rendered usable without the deposit of any coin therein but only under the telephone-address limitation imposed by the preprogramming within said automatic dialing apparatus.

2. The subject matter claimed in claim 1 wherein said line comprises three conductors and is energized for dialing and communication thereover by the energization of one pair, and said energization command requires the temporary conduction of current between a second pair, of said conductors.

3. The subject matter claimed in claim 2 wherein said switch means is connected with, and is operable to transmit an energization command over the line by effecting a temporary conduction of current between, said second pair of conductors.

4. The subject matter claimed in claim 1 wherein said automatic dialing apparatus includes control means which are normally unenergized but upon actuation of said apparatus become energized from the exchange over the telephone line until after the impression of said series of signals on the line.

5. The subject matter claimed in claim 4 wherein the operative connection of said automatic dialing apparatus with said switch means provides for actuation of said apparatus subsequent to the initiation of line energization invoked by operation of said switch means.

* * * * *